US010924233B2

(12) United States Patent
Kim et al.

(10) Patent No.: US 10,924,233 B2
(45) Date of Patent: *Feb. 16, 2021

(54) DATA TRANSMISSION METHOD AND APPARATUS IN NETWORK SUPPORTING COORDINATED TRANSMISSION

(71) Applicant: Samsung Electronics Co., Ltd., Suwon-si (KR)

(72) Inventors: Younsun Kim, Seongnam-si (KR); Juho Lee, Suwon-si (KR); Hyojin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,332

(22) Filed: Jul. 31, 2017

(65) Prior Publication Data

US 2017/0346610 A1    Nov. 30, 2017

Related U.S. Application Data

(63) Continuation of application No. 14/687,287, filed on Apr. 15, 2015, now Pat. No. 9,722,747, which is a
(Continued)

(51) Int. Cl.
*H04L 5/00* (2006.01)
*H04W 76/25* (2018.01)
(Continued)

(52) U.S. Cl.
CPC ........ *H04L 5/0048* (2013.01); *H04L 27/2613* (2013.01); *H04W 72/042* (2013.01);
(Continued)

(58) Field of Classification Search
CPC .............. H04L 5/0048; H04L 27/2613; H04L 27/2655; H04W 72/046; H04W 76/045; H04W 88/08; H04B 7/024
See application file for complete search history.

(56) References Cited

U.S. PATENT DOCUMENTS 9,867,174 B2 * 1/2018 Zhang .................... H04B 7/024
2010/0303034 A1   12/2010 Chen et al.
(Continued)

FOREIGN PATENT DOCUMENTS

KR    10-2011-0108289 A    10/2011

OTHER PUBLICATIONS

'DMRS Scrambling for Downlink CoMP.', R1-114226, 3GPP TSG RAN WG1 #67; Nov. 14-18, 2011.
(Continued)

*Primary Examiner* — Saad A. Waqas
(74) *Attorney, Agent, or Firm* — Jefferson IP Law, LLP

(57) ABSTRACT

A data transmission method and an apparatus in a network supporting coordinated multipoint transmission are provided. The method includes transmitting candidate sets of initial state information used to generate Demodulation Reference Signal (DMRS) scrambling sequences for the transmission points to the UE, and transmitting an indication corresponding to at least one candidate set of initial state information respectively associated with at least one transmission point to the UE, wherein the initial state information is used by the UE to generate DMRS scrambling sequences.

12 Claims, 14 Drawing Sheets

Related U.S. Application Data continuation of application No. 13/761,857, filed on Feb. 7, 2013, now Pat. No. 9,025,551.

(60) Provisional application No. 61/597,139, filed on Feb. 9, 2012, provisional application No. 61/596,019, filed on Feb. 7, 2012.

(51) Int. Cl.
*H04L 27/26* (2006.01)
*H04W 72/04* (2009.01)
*H04B 7/024* (2017.01)
*H04W 88/08* (2009.01)

(52) U.S. Cl.
CPC ............ *H04W 76/25* (2018.02); *H04B 7/024* (2013.01); *H04L 27/2655* (2013.01); *H04W 88/08* (2013.01)

(56) References Cited

U.S. PATENT DOCUMENTS

| | | |
|---|---|---|
| 2011/0013615 A1 | 1/2011 | Lee et al. |
| 2011/0038310 A1* | 2/2011 | Chmiel ............... H04L 27/2613 370/328 |
| 2011/0237283 A1 | 9/2011 | Shan et al. |
| 2011/0255486 A1 | 10/2011 | Luo et al. |
| 2011/0274197 A1 | 11/2011 | Zhu et al. |
| 2012/0176884 A1* | 7/2012 | Zhang ................... H04B 7/024 370/203 |
| 2013/0083750 A1 | 4/2013 | Nazar et al. |
| 2013/0083769 A1 | 4/2013 | Qu et al. |
| 2013/0163534 A1 | 6/2013 | Anderson et al. |
| 2013/0201931 A1 | 8/2013 | Noh et al. |
| 2013/0287064 A1 | 10/2013 | Seo et al. |
| 2014/0071936 A1* | 3/2014 | Zhang ................... H04L 5/0051 370/330 |
| 2014/0219202 A1 | 8/2014 | Kim et al. |

OTHER PUBLICATIONS

DL RS Ad-hoc Session Summary:, R1-106532, 3GPP TSG RAN WG1 Meeting #63.; Nov. 15-19, 2010.
UMTS; LTE; E-UTRA; Physical layer for relaying operation (3GPP TS 36.216 version 103.0 Release 10); Jun. 2011.
Pantech, DCI content to support CoMP, 3GPP TSG RAN WG1 #68; R1-120323; Jan. 31, 2012.
Samsung, DMRS Scrambling for DL CoMP, 3GPP TSG RAN WG1 #68, R1-120174; Jan. 31, 2012.
Korean Office Action dated Jan. 29, 2019, issued in a counterpart Korean application No. 10-2013-0013979.
ZTE; Initialization for DMRS in CoMP; 3GPP TSG RAN WG1 Meeting #68; R1-120304; Feb. 6-10, 2012; Dresden, Germany.
Korean Office Action with English translation dated May 13, 2019; Korean Appln. No. 10-2013-0013979.

\* cited by examiner

FIG. 5

| Other information | Information field indicating which candidate set to use for Cell ID, subframe offset, $n_{SCID}$ |
|---|---|

FIG. 6

| Other information | Information field indicating which candidate set to use for Cell ID and subframe offset | Information field indicating $n_{SICD}$ |

FIG. 8

| Other information | Information field indicating which candidate set to use for Cell ID, $n_{SCID}$ |
|---|---|

FIG. 9

| Other information | Information field indicating which candidate set to use for Cell ID | Information field indicating $n_{SICD}$ |

DATA TRANSMISSION METHOD AND APPARATUS IN NETWORK SUPPORTING COORDINATED TRANSMISSION

CROSS-REFERENCE TO RELATED APPLICATION(S)

This application is a continuation application of prior application Ser. No. 14/687,287, filed on Apr. 15, 2015 in the U.S. Patent and Trademark Office, which issues as U.S. Pat. No. 9,722,747 on Aug. 1, 2017 which is a continuation application of prior application Ser. No. 13/761,857, filed on Feb. 7, 2013 in the U.S. Patent and Trademark Office, which has issued as U.S. Pat. No. 9,025,551 on May 5, 2015 and claimed the benefit under 35 U.S.C. § 119(e) of a U.S. Provisional application filed on Feb. 7, 2012 in the U.S. Patent and Trademark Office and assigned Ser. No. 61/596,019, and of a U.S. Provisional application filed on Feb. 9, 2012 in the U.S. Patent and Trademark Office and assigned Ser. No. 61/597,139, the entire disclosure of each of which is hereby incorporated by reference.

BACKGROUND OF THE INVENTION

1. Field of the Invention

The present invention relates to a method and apparatus for data transmission in a network supporting coordinated transmission. More particularly, the present invention relates to a data transmission method and apparatus wherein, in order to send data to a User Equipment (UE) through multiple transmission points, a base station sends information used to generate a Demodulation Reference Signal (DMRS) scrambling sequence and the UE generates the DMRS scrambling sequence using the received information.

2. Description of the Related Art

In contrast to related-art mobile communication systems that may provide only voice-oriented services, advanced mobile communication systems may provide high-quality data and multimedia services using high-speed packet data communication. In recent years, in order to support high-speed and high-quality packet data transmission services, various mobile communication standards, such as High Speed Downlink Packet Access (HSDPA), High Speed Uplink Packet Access (HSUPA), Long Term Evolution (LTE), Long Term Evolution Advanced (LTE-A), developed by the $3^{rd}$ Generation Partnership Project (3GPP), High Rate Packet Data (HRPD), developed by the 3GPP 2 (3GPP2), and Institute of Electrical and Electronics Engineers (IEEE) 802.16, have been developed.

In particular, the LTE system has been developed so as to efficiently support high-speed wireless packet data transmission and also attempts to maximize wireless system throughput using various radio access technologies. LTE-A is an advanced version of LTE with increased data rates. Existing $3^{rd}$ Generation (3G) packet data communication systems, such as HSDPA, HSUPA and HRPD employ Adaptive Modulation and Coding (AMC) and channel-aware scheduling in order to enhance transmission efficiency.

A transmitter using AMC may adjust an amount of transmission data according to channel state. That is, when channel conditions are not good, the amount of transmission data may be reduced so as to maintain a desired error rate at the receiver, and when channel conditions are favorable, the amount of transmission data may be increased for higher efficiency while maintaining a desired error rate at the receiver.

The transmitter using channel-aware scheduling for resource management may selectively serve a specific user, from among many users, with the most favorable channel conditions. Hence, system throughput may be increased in comparison to a case in which channel resources are allocated to one user. This effect is referred to as multi-user diversity gain. In other words, the transmitter employing AMC and channel-aware scheduling receives partial channel state information as feedback from receivers and applies appropriate modulation and coding schemes in a timely manner When AMC is used together with Multiple Input Multiple Output (MIMO) transmission, AMC may also be used to determine a number, or rank, of spatial layers, which may also be referred to as transmission layers, for signal transmission. In this case, in addition to the coding rate and modulation scheme, the number of transmission layers to be used may be considered in order to determine an optimal data rate.

Recently, Code Division Multiple Access (CDMA) used in $2^{nd}$ Generation (2G) and 3G mobile communication systems is being merged into Orthogonal Frequency Division Multiple Access (OFDMA) in next generation mobile communication systems. As OFDMA is expected to increase system throughput beyond CDMA, systems developed by the 3GPP and 3GPP2 have initiated standardization of evolved systems based on OFDMA. Increased system throughput using OFDMA may be achieved by using frequency domain scheduling. As channel-aware scheduling considers channel conditions varying with time in order to increase system throughput, consideration of channel conditions varying with frequency may contribute to further enhancement of system throughput.

FIG. 1 illustrates a cellular system having multiple cells according to the related art.

Referring to FIG. 1, a cellular system may provide mobile communication services using various schemes described above. More specifically, in the mobile communication system having three cells, Cell 0 through Cell 2 shown in FIG. 1, an antenna for transmission and reception is installed in each cell. A Base Station (BS), such as an enhanced Node B (eNB), may be placed at each of cells Cell 0, Cell 1 and Cell 2, in order to send data to User Equipments (UEs within the corresponding cell.

A UE 0 within a service area of Cell 0 receives a data signal 100 from the eNB of Cell 0. Similarly, eNBs of Cell 1 and Cell 2 respectively send data signals 110 and 120 to UE 1 and UE 2 using the same time-frequency resources. Respective transmissions from Cell 0, Cell 1 and Cell 2 to UE 0, UE 1 and UE 2 correspond to non-Coordinated MultiPoint (non-CoMP) transmission, wherein radio resources of one cell are used only for UEs within the cell.

In FIG. 1, a UE within a cell may know an available time-frequency resource from among signals sent by the corresponding eNB in advance. For example, UE 0 may determine a location of a Cell-specific Reference Signal (CRS) and a number of OFDM symbols on a control channel in a time-frequency grid 130 formed by Cell 0 before reception of a Physical Downlink Shared Channel (PDSCH).

As shown in FIG. 1, PDSCH resources allocated to UE 0, UE 1 and UE 2 are different in the time-frequency grids 130, 140 and 150 formed respectively by Cell 0, Cell 1 and Cell 2. When non-CoMP transmission is used, a UE receives a signal from a fixed cell. For example, in FIG. 1, UE 0 receives a signal only from Cell 0, unless it is handed over to another cell through separate higher layer signaling.

In the time domain, an LTE and/or LTE-A downlink transmission, as shown in FIG. 1, may be split into a control region and a data region. The control region may be used to transmit control channels, such as a Physical Downlink Control Channel (PDCCH), a Physical HARQ Indicator Channel (PHICH), and a Physical Control Format Indicator Channel (PCFICH). In a subframe, the control region may correspond to one, two or three OFDM symbols from the beginning.

The data region may start at an OFDM symbol that is disposed immediately after the control region, and may be used for a PDSCH transmission. Because a subframe is composed of fixed number of OFDM symbols, the data region size may be determined by the control region size. In the LTE and/or LTE-A system, a UE may refer to control information carried by the PCFICH in order to know the control region size and in order to determine the data region size accordingly.

In FIG. 1, a signal sent by one cell may interfere with a signal sent by another cell, and accordingly, randomization of interference may enhance signal reception performance. For example, when signals are respectively sent from Cell 0 and Cell 1 to UE 0 and UE 1 through the same radio resources, the signals may interfere with each other. Thus, it is desirable to randomize interference for better reception performance. For this reason, in the LTE and/or LTE-A system, different scrambling sequences are applied to DeModulation Reference Signals (DMRS) sent by different cells. In order to achieve this, scrambling sequence generators of different cells have different initial states, because scrambling sequence generators with different initial states generate different scrambling sequences. That is, when cells apply differently initialized scrambling sequences, inter-cell interference may be effectively randomized.

In contrast to non-CoMP transmission, CoMP transmission enables multiple base stations to send signals to one UE. When CoMP transmission is used, one UE may receive signals from multiple base stations. Hence, it is possible to provide an improved data rate to a UE far from a base station. Similarly to the case of non-CoMP transmission, in order to randomize interference between signals from multiple base stations participating in CoMP transmission, the multiple base stations should apply different scrambling sequences.

Therefore, a need exists for a system and method for multiple base stations to apply different scrambling sequences for CoMP transmissions.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus that determine initial states for Demodulation Reference Signal (DMRS) scrambling so as to realize effective Coordinated Multipoint (CoMP) transmission and/or reception in a Long Term Evolution (LTE) and/or LTE-Advance (LTE-A) system.

In accordance with an aspect of the present invention, a data transmission method for a Base Station (BS) capable of sending data to a User Equipment (UE) through multiple transmission points is provided. The method includes transmitting candidate sets of initial state information used to generate DMRS scrambling sequences for the transmission points to the UE, and transmitting an indication corresponding to at least one candidate set of initial state information respectively associated with at least one transmission point to the UE, wherein the initial state information is used by the UE to generate DMRS scrambling sequences.

In accordance with another aspect of the present invention a data reception method for a UE capable of receiving data from a BS through multiple transmission points is provided. The method includes receiving, from the BS, candidate sets of initial state information used to generate DMRS scrambling sequences for the multiple transmission points, receiving, from the BS, an indication corresponding to a candidate set of initial state information associated with a transmission point determined in order to generate the DMRS scrambling sequences, determining an initial state for generating the DMRS scrambling sequences according to the indicated candidate set of initial state information, and generating the DMRS scrambling sequences according to the determined initial state.

In accordance with another aspect of the present invention, a data transmission apparatus acting as a base station is provided. The apparatus includes a wireless communication unit for sending data to a UE through multiple transmission points, and a control unit for controlling a process of transmitting, to the UE, candidate sets of initial state information used to generate DMRS scrambling sequences for the transmission points, and for transmitting an indication corresponding to at least one candidate set of initial state information respectively associated with at least one transmission point to the UE, wherein the initial state information is used by the UE to generate the DMRS scrambling sequences.

In accordance with another aspect of the present invention, a data reception apparatus acting as a UE is provided. The apparatus includes a wireless communication unit for receiving data from a BS through multiple transmission points, a control unit for controlling a process of receiving, from the BS, candidate sets of initial state information used to generate DMRS scrambling sequences for the multiple transmission points, and for receiving, from the BS, an indication corresponding to a candidate set of initial state information associated with a transmission point determined in order to generate the DMRS scrambling sequences, and a sequence generation unit for determining an initial state for generating the DMRS scrambling sequences according to the indicated candidate set of initial state information, and for generating the DMRS scrambling sequences according to the determined initial state.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description in conjunction with the accompanying drawings, in which:

FIG. 5 illustrates an information field indicating a set of three pieces of information for scrambling sequences, which is notified by an enhanced Node B (eNB) to a UE through a Physical Downlink Control Channel (PDCCH) or an Enhanced-PDCCH (E-PDCCH) according to an exemplary embodiment of the present invention;

FIG. 6 illustrates an information field indicating a set of Cell Identification (ID) and subframe offset values and another information field indicating an n Scrambling Identification ($n_{SCID}$) value, among three pieces of information for scrambling sequences, which are notified by an eNB to a UE through a PDCCH or an E-PDCCH according to an exemplary embodiment of the present invention;

FIG. 8 illustrates an information field indicating a set of two pieces of information for scrambling sequences, which is notified by an eNB to a UE through a PDCCH or an E-PDCCH according to an exemplary embodiment of the present invention;

FIG. 9 illustrates an information field indicating a Cell ID and another information field indicating an n Scrambling Identification ($n_{SCID}$) value, among two pieces of information for scrambling sequences, which are sent by an eNB to a UE through a PDCCH or an E-PDCCH according to an exemplary embodiment of the present invention;

Throughout the drawings, like reference numerals will be understood to refer to like parts, components, and structures.

DETAILED DESCRIPTION OF EXEMPLARY EMBODIMENTS

Figure 1:
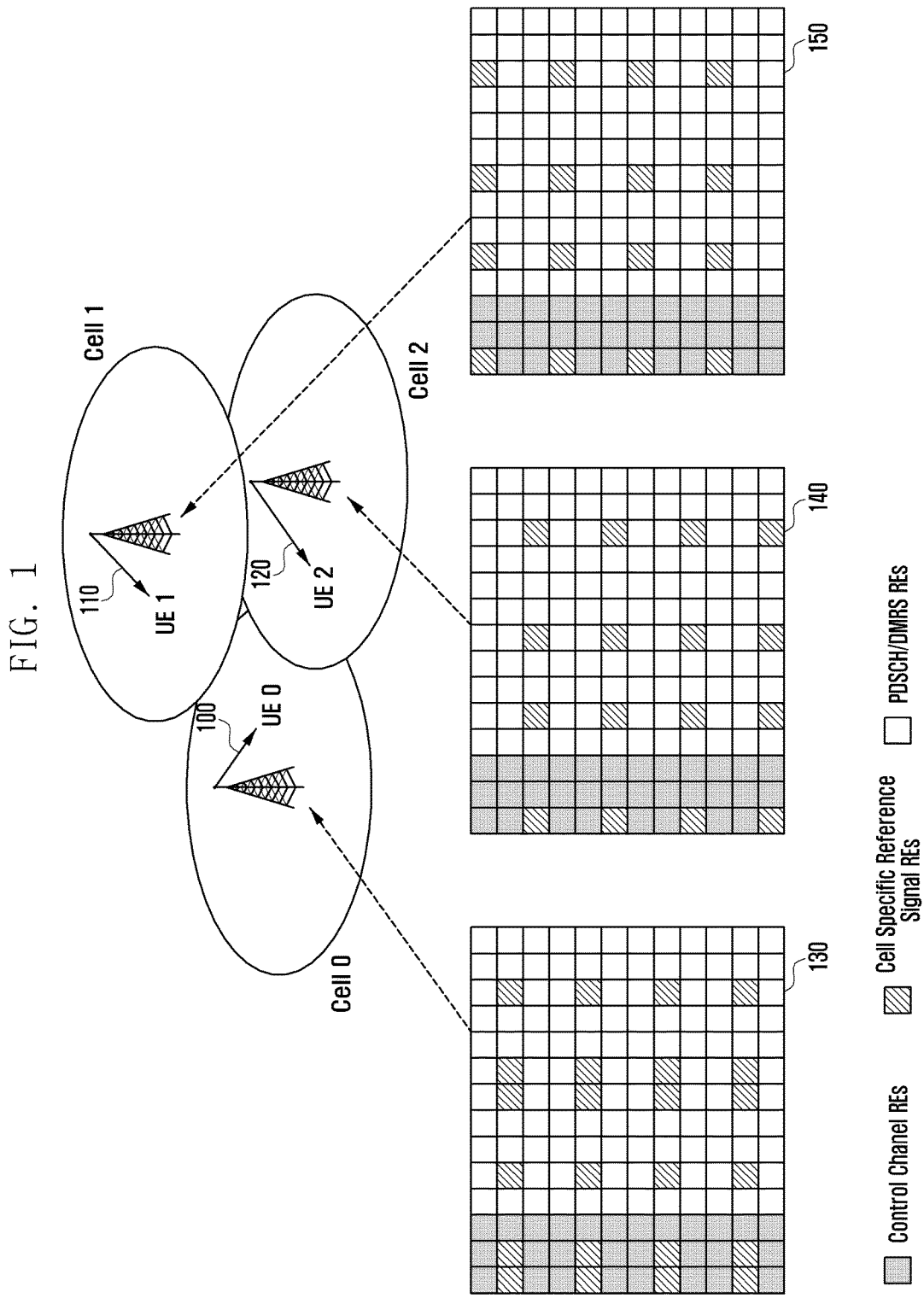
FIG. 1 illustrates a cellular system having multiple cells according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The exemplary embodiments are described below with respect to a wireless communication system based on Orthogonal Frequency Division Multiplexing (OFDM), in particular, with respect to the $3^{rd}$ Generation Partnership Project (3GPP) Evolved Universal Terrestrial Radio Access (EUTRA) standards. However, the present invention is not limited thereto, and features described below with respect to the exemplary embodiments are applicable to other communication systems having similar technical backgrounds and channel structures without much modification.

For interference randomization, a User Equipment (UE) determines an initial state for DMRS scrambling according to Equation 1.

$$c_{init} = (\lfloor n_s/2 \rfloor + 1) \cdot (2N_{ID}^{cell} + 1) \cdot 2^{16} + n_{SCID} \qquad \text{[Equation 1]}$$

In Equation 1, $n_s$ is a slot number in a current radio frame, $N_{cell}^{ID}$ is a Cell ID of a cell to which the UE is connected after handover or initial access, and n Scrambling Identification ($n_{SCID}$) is a scrambling index. Here, information needed to determine the initial state for DMRS scrambling, such as a slot number, the Cell ID, and the scrambling index, is referred to as initial state information. The UE may identify the Cell ID $N_{cell}^{ID}$ from a synchronization signal from the current cell. Alternatively, a Base Station (BS) may notify the Cell ID to the UE through higher layer signaling. In the present exemplary embodiment, the Cell ID that is notified through higher layer signaling is a virtual cell ID other than a physical Cell ID. However, the present invention is not limited thereto, and a physical cell ID or a virtual cell ID may be the Cell ID. The value of $n_{SCID}$ may be 0 or 1, and $n_{SCID}$ is notified by the network to the UE through a control channel PDCCH or E-PDCCH.

In addition, $n_s$ refers to a slot number in the current radio frame. In the LTE and/or LTE-A system, a time domain may be subdivided into radio frames, and each radio frame may have an interval of 10 ms. One radio frame is composed of ten subframes, and each subframe may have an interval of 1 ms. One subframe is split into two slots, and each slot has an interval of 0.5 ms. That is, one radio frame is composed of 20 slots, and the slot number identifies a specific slot, from among the 20 slots, in the radio frame. The UE may identify the beginning of a radio frame through time and frequency synchronization using a synchronization signal and may determine the slot number of a particular slot.

In order to avoid collision between synchronization signals, different cells may apply time differences. In the present exemplary embodiment, different cells may be associated with different slot numbers in the same time interval.

This time difference may be referred to as subframe offset, and subframe offsets may be assigned to different cells in units of 1 ms.

In LTE and/or LTE-A Release 10, as described before, $n_{SCID}$ is notified to the UE through a PDCCH or an E-PDCCH. Table 1 illustrates 3-bit control information that may be transmitted from the base station to the UE to notify $n_{SCID}$.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In the LTE and/or LTE-A system supporting Coordinated Multi Point (CoMP) transmission, Dynamic Point Selection (DPS) may be used for CoMP operations. When DPS is used, transmission points, which perform downlink transmission to a given UE, may be actively changed in consideration of radio channel states, the amount of downlink radio traffic and a presence of other UEs, and a transmission point may correspond to a cell with unique Cell ID.

In the LTE and/or LTE-A system, a DMRS and a PDSCH are transmitted using a same Resource Block (RB) in a same subframe. The UE performs channel estimation using the received DMRS and performs channel decoding for the PDSCH. In other words, the UE has to perform channel estimation using the received DMRS to decode data carried by the PDSCH. In a network supporting CoMP transmission based on DSP, individual transmission points may have different Cell IDs and ns values. In this case, a UE generates scrambling sequences by applying Cell IDs and ns values corresponding to the cells transmitting to the UE.

Figure 2:
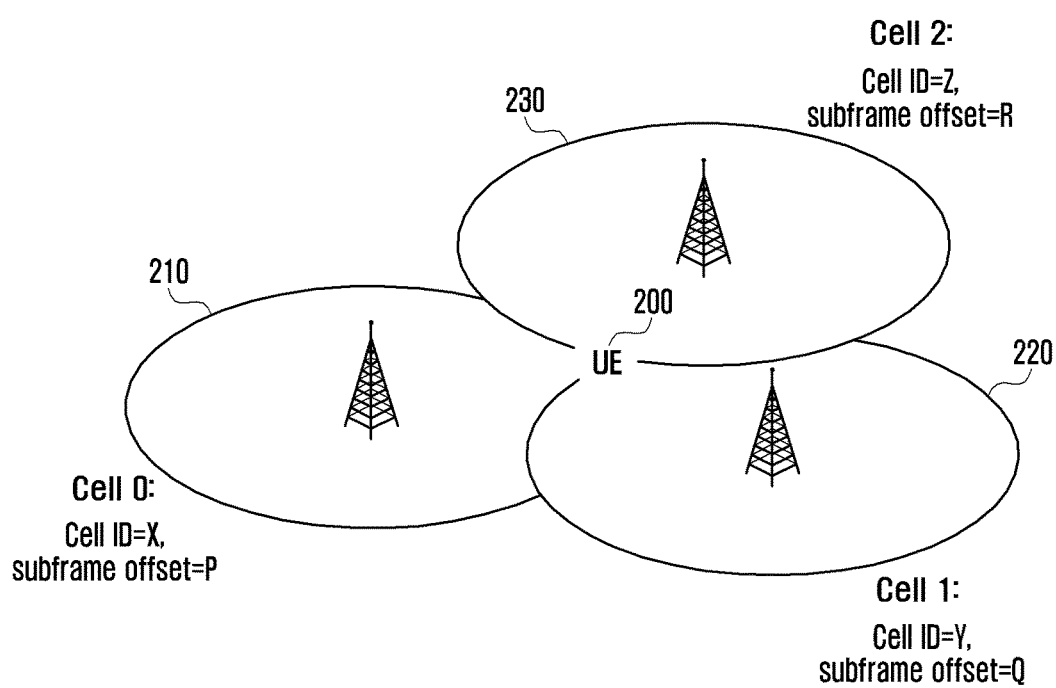
FIG. 2 illustrates a Long Term Evolution (LTE) and/or LTE-Advanced (LTE-A) multi-cell system supporting Dynamic Point Selection (DPS) in which a User Equipment (UE) receives a Physical Downlink Shared Channel (PDSCH) and a Demodulation Reference Signal (DMRS) from one of at least three different cells according to an exemplary embodiment of the present invention.

FIG. 2 illustrates an LTE and/or LTE-A multi-cell system supporting DPS, in which a UE receives a PDSCH and a DMRS from one of at least three different cells.

Referring to FIG. 2, Cell 0 210 has Cell ID of X and $n_s$ of P, Cell 1 220 has Cell ID of Y and $n_s$ of Q, and Cell 2 230 has Cell ID of Z and $n_s$ of R. When different transmission points, i.e., cells, have different Cell IDs and subframe offsets as in the case of the present exemplary embodiment, then the UE 200 may be unable to determine an initial state for the DMRS scrambling sequences using Equation 1 only.

That is, in order to determine the initial state for DMRS scrambling sequences, the UE needs to identify the Cell ID and the $n_s$ value applied to the initial state. For example, in FIG. 2, in order to receive the PDSCH from Cell 0, the UE 200 determines the initial state on the basis of the Cell ID and the subframe offset used by Cell 0. Furthermore, in order to receive the PDSCH from Cell 1, the UE 200 determines the initial state on the basis of the Cell ID and the subframe offset used by Cell 1, and, in order to receive the PDSCH from Cell 2, the UE 200 determines the initial state on the basis of the Cell ID and the subframe offset used by Cell 2.

In a system supporting CoMP operation, an optimal combination of cells participating in actual downlink transmission may be instantly changed according to traffic and wireless channel conditions. That is, in a mobile communication system such as the LTE-A system, which performs scheduling every 1 ms, cells participating in a CoMP transmission may change every 1 ms. As such, a network supporting CoMP operation notifies a UE of the Cell IDs and the subframe offsets of cells currently participating in downlink transmission. This notification may be performed by a central controller that is managing radio resources of multiple transmission points on a scheduling unit basis.

Notification of the Cell IDs and the subframe offsets of cells participating in downlink transmission provides sufficient randomization of interference between transmission points and, thus, supports MU-MIMO operation. In MU-MIMO, one transmission point may send spatially separated radio signals using a same time-frequency resource to multiple UEs. As an example of MU-MIMO, a transmission point may send different pieces of data to two mobile terminals using the same time-frequency resource on spatially separated radio signals. When MU-MIMO is used to simultaneously send to multiple UEs, it is important to send DMRSs preserving orthogonality to the UEs. When DMRSs preserve orthogonality in MU-MIMO transmission, a UE is free from DMRS interference with other UEs.

For MU-MIMO operation, the LTE and/or LTE-A system provides DMRSs based on two orthogonal codes. That is, in LTE and/or LTE-A Release 10, DMRS port 7 and DMRS port 8 are sent using the same radio resource but different orthogonal codes. When a BS respectively performs a downlink transmission of rank 1 to two UEs, the BS may preserve orthogonality between DMRSs assigned to the UEs by means of DMRS port 7 and DMRS port 8. In order to preserve orthogonality between DMRS ports using the same radio resources, the same scrambling to corresponding DMRSs should be applied. For example, when Cell 1 performs MU-MIMO operation, in order to preserve orthogonality between DMRS ports assigned to different UEs, Cell 1 should scramble the DMRS ports in the same way.

Figure 3A:
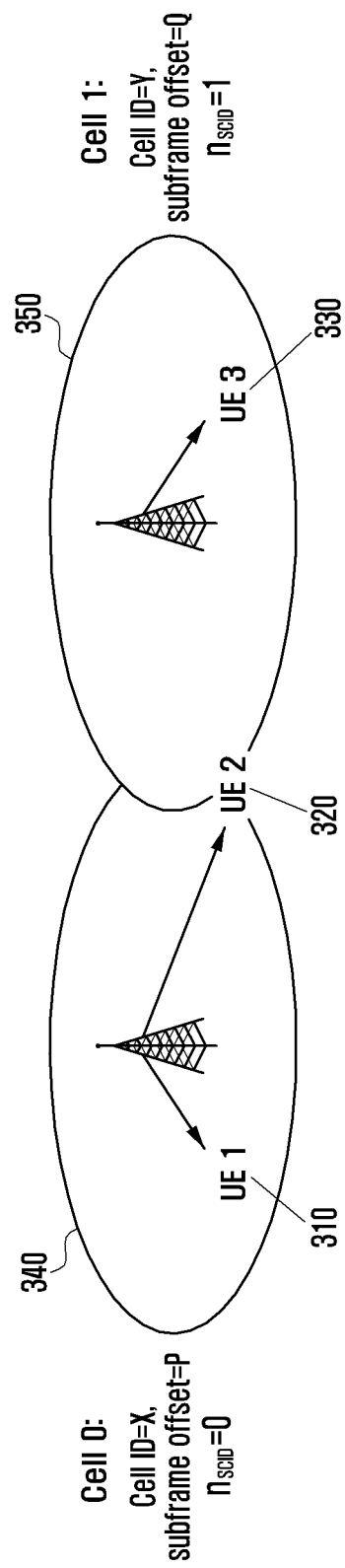
FIGS. 3A and 3B illustrate Multi User-Multi Input Multi Output (MU-MIMO) transmission in a multi-cell network supporting Coordinated Multi Point (CoMP) operation according to an exemplary embodiment of the present invention.
Figure 3B:
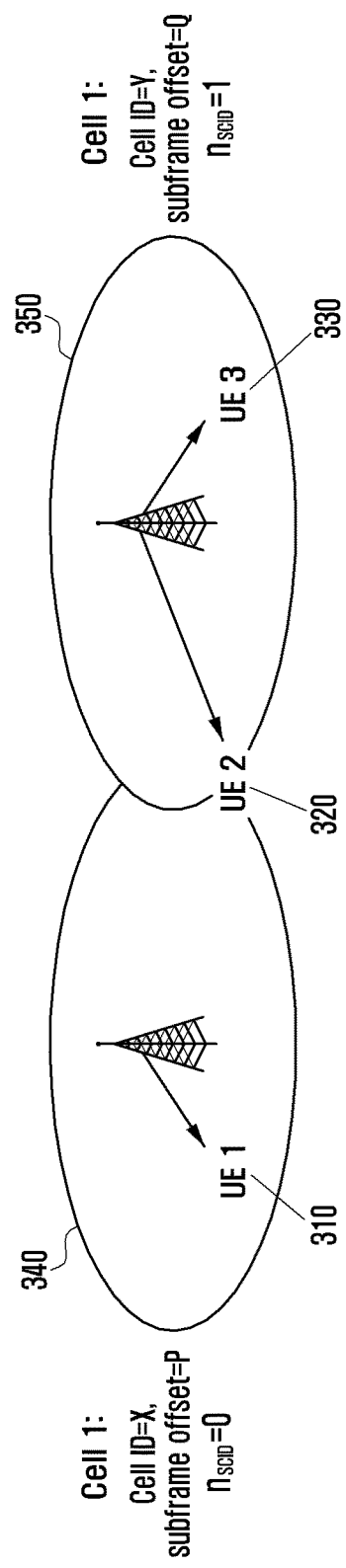

FIGS. 3A and 3B illustrate MU-MIMO transmission in a multi-cell network supporting CoMP operation according to an exemplary embodiment of the present invention.

Referring to FIGS. 3A and 3B, UE 1 310, UE 2 320 and UE 3 330 receive signals from two cells, Cell 0 340 and Cell 1 350. Herein, UE2 320 may receive a PDSCH from Cell 0 340 or Cell 1 350. That is, the network supports DPS.

In FIG. 3A, UE 2 320 receives a PDSCH from Cell 0 340. Also, UE 2 320 configures an initial state in accordance with a Cell ID and a subframe offset of Cell 0 340, and generates scrambling sequences based on the initial state. The reason UE 2 320 configures the initial state according to Cell 0 340 is to preserve orthogonality between the DMRS ports respectively assigned to UE 1 310 and UE 2 320 when Cell 0 340 transmits the PDSCH to UE 1 310 and UE 2 320 through MU-MIMO.

In FIG. 3B, in order to receive the PDSCH from Cell 1 350, UE 2 320 configures the initial state according to the Cell ID and the subframe offset of Cell 1 350. Similar to the exemplary embodiment of FIG. 3A, UE 2 320 configures the initial state according to Cell 1 350 in order to preserve orthogonality between the DMRS ports respectively assigned to UE 2 320 and UE 3 330 when Cell 1 350 transmits the PDSCH to UE 2 320 and UE 3 330 through MU-MIMO.

As described above, in order to support DPS, a UE may configure the initial state in accordance with the Cell ID and the subframe offset of one of multiple cells and may generate DMRS scrambling sequences based on the initial state.

Accordingly, the present exemplary embodiments show a scheme that notifies a UE of a Cell ID and a subframe offset through PDCCH or E-PDCCH.

According to an exemplary embodiment for notifying information on the DMRS scrambling sequences to a UE, the BS may notify the UE in advance of candidate sets of the Cell ID, the ns and the nSCID values through higher layer signaling and may send the UE an indication specifying one of the candidate sets to be used in order to configure the initial state for DMRS scrambling through PDCCH or E-PDCCH.

Figure 4:
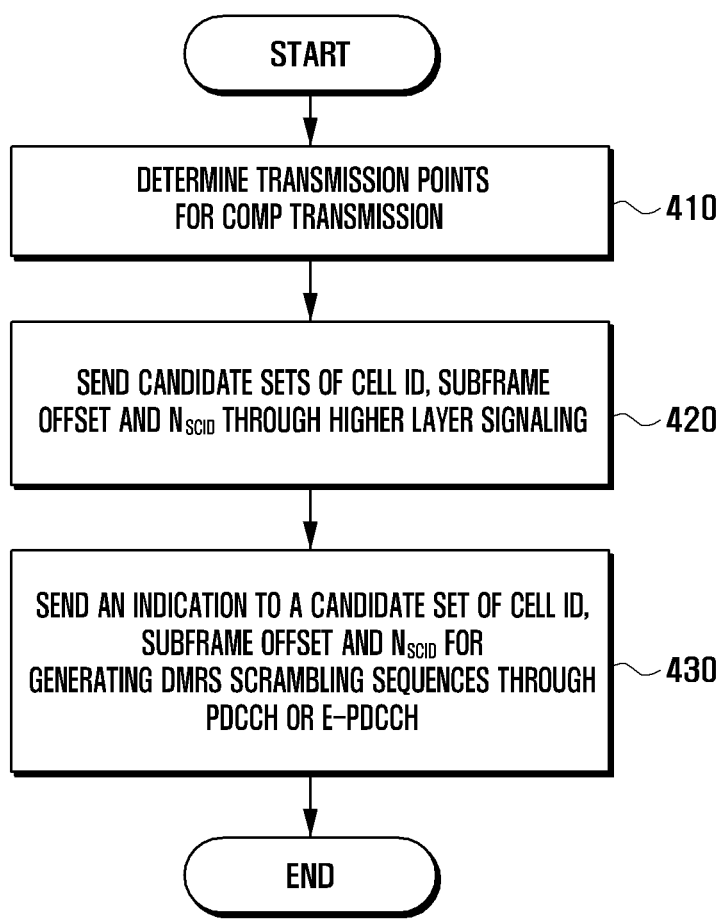
FIG. 4 is a flowchart of a procedure to determine an initial state for DMRS scrambling according to an exemplary embodiment of the present invention.

FIG. 4 is a flowchart of a procedure to determine an initial state for DMRS scrambling according to an exemplary embodiment of the present invention.

Referring to FIG. 4, a BS determines transmission points to be assigned to a UE within a coverage area thereof in step 410. That is, for CoMP operation, the BS may determine a set of transmission points whose radio resources are to be utilized for the UE. For example, in order to support DPS, the BS may determine a set of cells capable of sending a PDSCH to the UE. Then, the BS notifies the UE of candidate sets of the Cell ID, the $n_s$ and the $n_{SCID}$ values through higher layer signaling in step 420.

The BS sends the UE an indication specifying one of the candidate sets to be used to configure the initial state for DMRS scrambling through the PDCCH or the E-PDCCH in step 430. Upon reception of the indication, the UE determines an initial state for DMRS scrambling using the indicated Cell ID, $n_s$ and $n_{SCID}$ values.

Table 2 illustrates candidate sets of Cell ID, subframe offset and $n_{SCID}$ values notified to the UE at step 420.

TABLE 2

|  | Cell ID | Subframe offset | $n_{SCID}$ |
|---|---|---|---|
| Candidate Set 1 | X | A | 0 |
| Candidate Set 2 | Y | B | 1 |

After notification of candidate sets of Cell ID, subframe offset and $n_{SCID}$ values, as illustrated in Table 2, the BS sends an indication to the candidate set to be used at step 430, and the UE configures the initial state for DMRS scrambling using the indicated candidate set. According to the present exemplary embodiment, the Cell ID, subframe offset and $n_{SCID}$ values may be notified as a group of information, as illustrated in Table 2. However the present invention is not limited thereto, and the BS may provide the Cell ID, subframe offset and $n_{SCID}$ values individually to the UE.

FIG. 5 illustrates an information field indicating a set of three pieces of information for scrambling sequences, which is notified by eNB to UE through the PDCCH or the E-PDCCH.

Referring to FIG. 5, the BS may send an information field of one or more bits indicating a candidate set of the Cell ID, subframe offset and $n_{SCID}$ values to the UE.

FIG. 6 illustrates an information field indicating a set of Cell ID and subframe offset values and another information field indicating $n_{SCID}$ value, among three pieces of information for scrambling sequences, which are notified by an eNB to a UE through a PDCCH or an E-PDCCH.

Referring to FIG. 6, the BS may use the PDCCH or E-PDCCH to send the UE an information field including one or more bits indicating a candidate set of the Cell ID and subframe offset values and another information field containing the $n_{SCID}$ value and other information, such as a DMRS antenna port allocation. In another exemplary embodiment for notifying the UE about information on the DMRS scrambling sequences, the BS may notify the UE about only the Cell ID and the $n_{SCID}$ information, and the UE may then determine the subframe offset using received Cell ID. That is, the UE receives the Cell ID and $n_{SCID}$ values from the BS through the PDCCH or the E-PDCCH, as is the case of the exemplary embodiment of FIG. 4. Then, the UE identifies the subframe offset using the received Cell ID, and determines the initial state for the DMRS scrambling.

Hence, in present exemplary embodiment of FIG. 6, the UE autonomously identifies, in advance, the Cell IDs and the subframe offsets of cells in the vicinity of the UE. As described before, a UE may identify the Cell ID and the subframe offset of a cell by receiving a synchronization signal from the cell. In the LTE and/or LTE-A system, a Primary Synchronization Signal (PSS) and Secondary Synchronization Signal (SSS) are transmitted every 10 ms as a synchronization signal and may provide information on the Cell ID and the radio frame start point to UEs.

In the exemplary embodiment of FIG. 6, the UE identifies candidate cells capable of sending the PDSCH thereto through the DPS and identifies the Cell IDs and the subframe offsets by receiving synchronization signals from the candidate cells. The candidate cells capable of participating in the DPS operation may be identified by the UE or the BS may notify the UE of such candidate cells. The UE may identify candidate cells by measuring intensity of signals from individual cells. The BS may notify the UE of candidate cells capable of participating in DPS operation through higher layer signaling.

Figure 7:
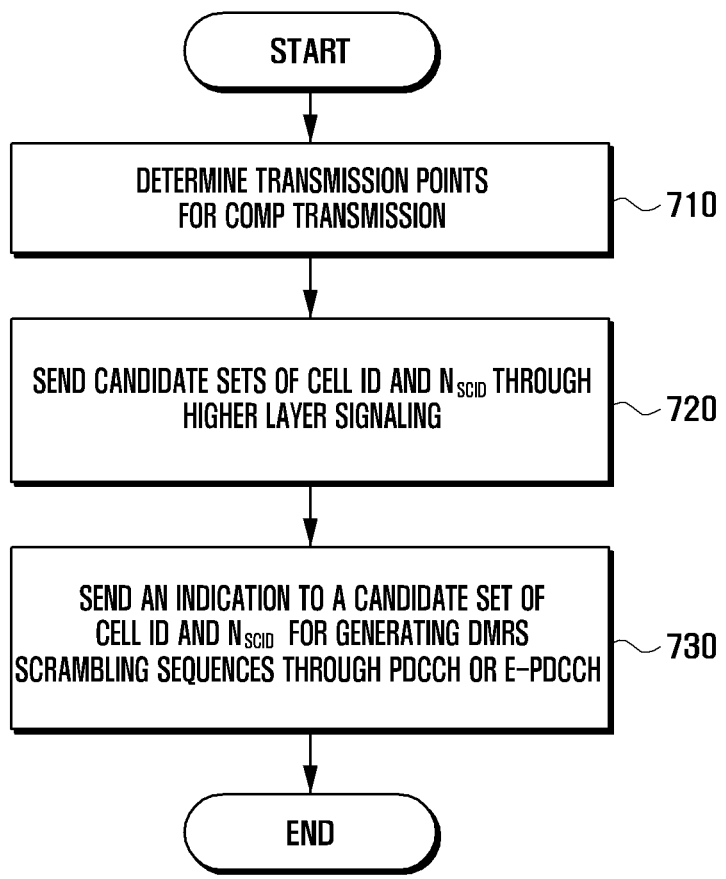
FIG. 7 is a flowchart of an eNB procedure to determine an initial state for DMRS scrambling according to an exemplary embodiment of the present invention.

FIG. 7 is a flowchart of an eNB procedure to determine an initial state for DMRS scrambling according to the second exemplary embodiment of the present invention.

Referring to FIG. 7, the BS determines candidate transmission points or cells capable of participating in DPS operation for a UE in step 710. Next, the BS notifies the UE of the Cell IDs and $n_{SCID}$ values of the candidate transmission points or notifies the UE of the cells determined at step 710 through higher layer signaling in step 720.

The BS notifies the UE of the Cell ID and the nSCID value to be used in order to determine the initial state for DMRS scrambling through the PDCCH or the E-PDCCH in step 730. Similar to the exemplary embodiment of FIG. 4, for one candidate cell, the BS may notify the UE of the Cell ID and the $n_{SCID}$ value as a group of information or may notify the UE of the Cell ID and the $n_{SCID}$ value separately.

FIG. 8 illustrates an information field indicating a set of two pieces of information for scrambling sequences, which is notified by the eNB to the UE through the PDCCH or the E-PDCCH according to an exemplary embodiment of the present invention.

Referring to FIG. 8, the BS, which may be the eNB, may send an information field, including one or more bits indicating a candidate set of the Cell ID and $n_{SCID}$ value, and other information to the UE.

FIG. 9 illustrates an information field indicating the Cell ID and another information field indicating the $n_{SCID}$ value, among two pieces of information for scrambling sequences, which are sent by eNB to UE through the PDCCH or the E-PDCCH according to an exemplary embodiment of the present invention.

Referring to FIG. 9, the stations, which may be the eNB, may use the PDCCH or the E-PDCCH to send the UE an information field including one or more bits indicating the Cell ID and another information field containing the $n_{SCID}$ value and other information, such as DMRS antenna port allocation. After the reception of the Cell ID and the $n_{SCID}$ value, the UE may determine a subframe offset of a corresponding cell using the received Cell ID and $n_{SCID}$ value, and may generate the DMRS scrambling sequences using the subframe offset.

Figure 10:
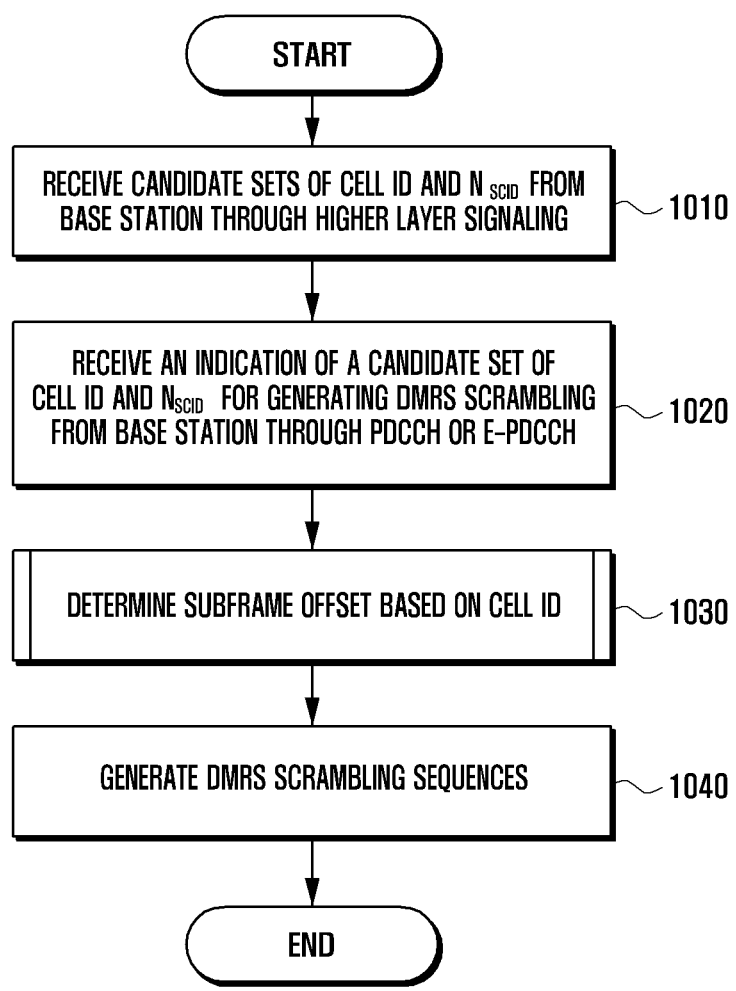
FIG. 10 is a flowchart of a UE procedure to generate DMRS scrambling sequences according to the second exemplary embodiment of the present invention.

FIG. 10 is a flowchart of a UE procedure to generate the DMRS scrambling sequences according to the second exemplary embodiment of the present invention.

Referring to FIG. 10, the UE receives candidate Cell IDs and $n_{SCID}$ values from a BS through higher layer signaling in step 1010. As described above, the candidate Cell ID and the $N_{SCID}$ value may be received as a candidate set, i.e. as a group, or may be separately received. The UE receives an indication of the Cell ID and the $n_{SCID}$ value to be used to generate the DMRS scrambling sequences from the BS through the PDCCH or the E-PDCCH in step 1020. The indication of the Cell ID and the $n_{SCID}$ value may be transmitted using an information field described with reference to FIGS. 8 and 9.

The UE determines a subframe offset in accordance with the indicated Cell ID in step 1030. As described before, the UE identifies, in advance, the Cell IDs and the subframe offsets of cells in the vicinity of the UE. The UE determines the initial state for the DMRS scrambling using the notified Cell ID and the $n_{SCID}$ value and using the determined subframe offset, and then generates the DMRS scrambling sequences in step 1040.

Figure 11:
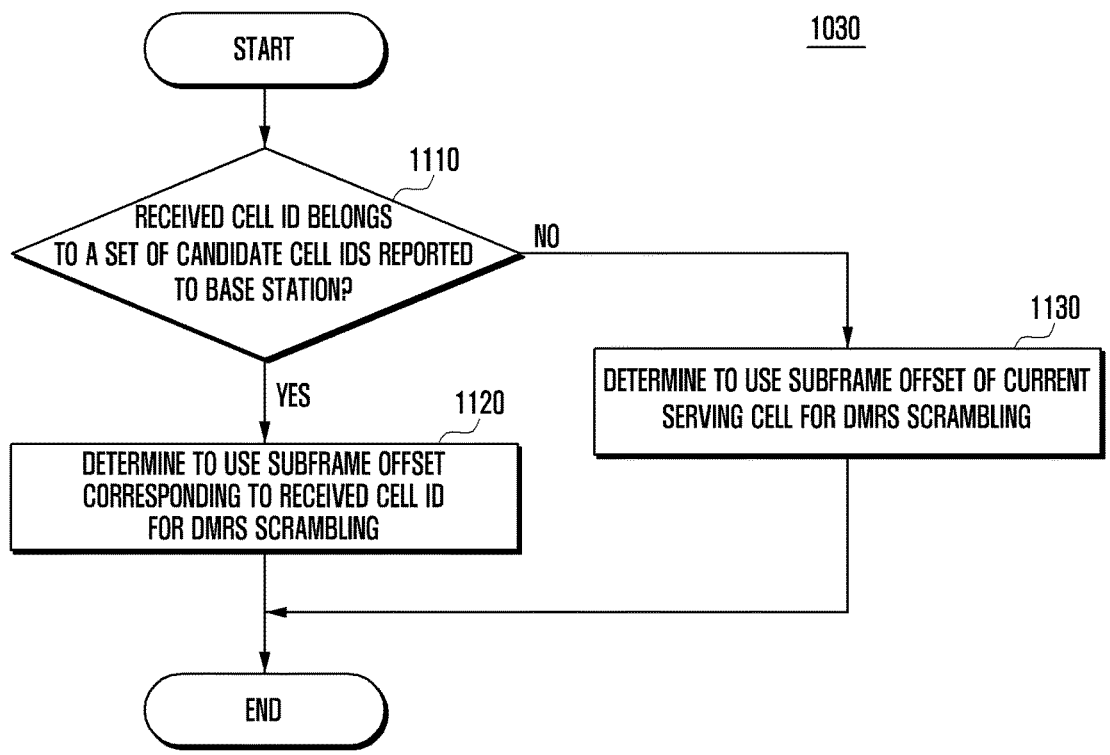
FIG. 11 is a flowchart for determining a subframe offset using received Cell ID in the procedure of FIG. 10 according to an exemplary embodiment of the present invention.

FIG. 11 is a detailed flowchart for determining a subframe offset using a received Cell ID in the procedure of FIG. 10 according to an exemplary embodiment of the present invention.

Referring to FIG. 11, the UE determines whether the Cell ID received from the BS belongs to a set of candidate Cell IDs that have been reported to the BS as a result of a Reference Signal Received Power (RSRP) measurement in step 1110. If it is determine, in step 1110, that the received Cell ID belongs to the set of reported candidate Cell IDs, then the UE determines to use a subframe offset corresponding to the received Cell ID for the DMRS scrambling in step 1120. In contrast, when the received Cell ID does not belong to the set of reported candidate Cell IDs, the UE determines to use a subframe offset of the current serving cell for the DMRS scrambling in step 1130.

The RSRP measurement performed by a UE refers to an intensity measurement of a cell-specific Reference Signal (CRS) sent by a cell. In the LTE and/or LTE-A system, the RSRP measurement reports are used by the BS to determine whether to hand over a UE to another cell. The RSRP measurement for a cell implies that the UE has received a synchronization signal from the cell and has identified the Cell ID and the subframe offset of the cell. Therefore, in the exemplary embodiment of FIG. 6, for a given cell, the UE may identify the subframe offset of the cell without separate signaling.

As an example for the exemplary embodiment shown in FIG. 6, in a case where the UE has sent the BS an RSRP measurement report for two cells having Cell ID X and Cell ID Y. In this case, the UE is aware of the subframe offsets of the cells with Cell ID X and Cell ID Y. Thereafter, when the BS notifies the UE of the Cell ID X through the PDCCH or the E-PDCCH, then the UE may use the subframe offset corresponding to Cell ID X, which is already known to the UE, in order to determine the initial state for the DMRS scrambling without additional signaling.

Likewise, when the BS notifies the UE of Cell ID Y through the PDCCH or the E-PDCCH, then the UE may use the subframe offset corresponding to Cell ID Y to determine the initial state for the DMRS scrambling. On the other hand, when the BS notifies the UE of Cell ID Z through the PDCCH or the E-PDCCH, because an RSRP measurement report for a cell with Cell ID Z has not been sent, the UE uses a subframe offset of the current serving cell to determine the initial state for the DMRS scrambling.

As described above, the BS provides information on the scrambling sequences to the UE, and generates the DMRS scrambling sequences according to the information and sends the same to the UE. The UE generates scrambling sequences based on the received information, performs channel estimation using the generated scrambling sequences and the received scrambling sequences, and receives data from the BS according to the channel estimation result.

Figure 12:
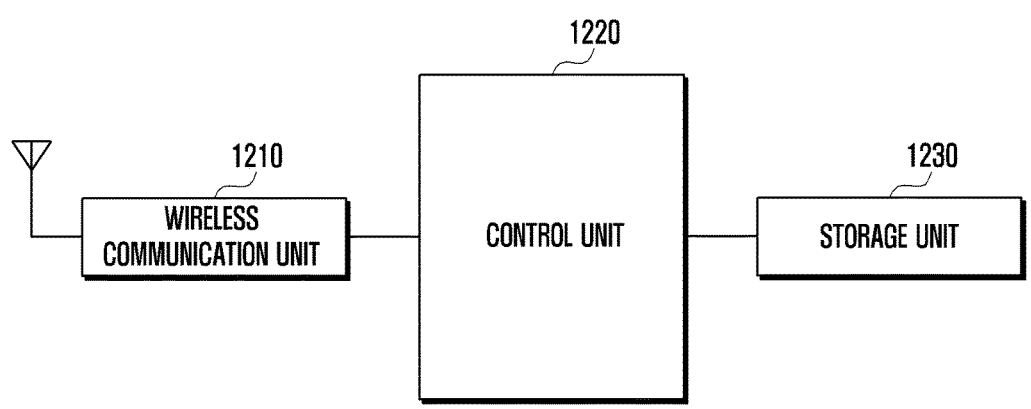
FIG. 12 is a block diagram of a data transmission apparatus according to an exemplary embodiment of the present invention.

FIG. 12 is a block diagram of a data transmission apparatus according to an exemplary embodiment of the present invention.

Referring to FIG. 12, the data transmission apparatus, which may be an eNB and/or a BS, may include a wireless communication unit 1210, a control unit 1220, and a storage unit 1230. The wireless communication unit 1210 may send and receive data and signals to and from UEs within the coverage area of the BS. In particular, the wireless communication unit 1210 may sends information for the DMRS scrambling to a UE under control of the control unit 1220.

The control unit 1220 controls operations to transmit information on multiple candidate transmission points to a UE through higher layer signaling, and to send information used for determining the initial state for the DMRS scrambling to the UE through the PDCCH or the E-PDCCH. Furthermore, the control unit 1220 may control overall operations of the BS and components and elements included in the BS. The storage unit 1230 may store information necessary for performing the operations of the exemplary embodiments of the present invention as described above. For example, the storage unit 1230 may store information as illustrated in Table 1 and Table 2. Furthermore, the storage unit 1230 may store information, applications, and other information used for the operations of the BS.

Figure 13:
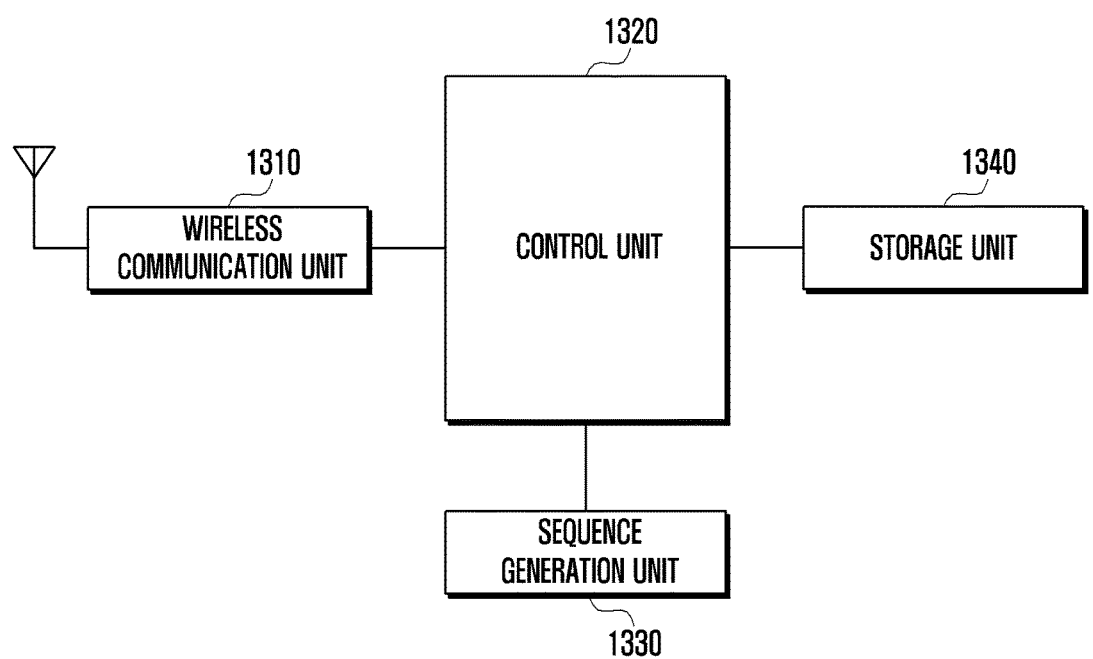
FIG. 13 is a block diagram of a data reception apparatus according to an exemplary embodiment of the present invention.

FIG. 13 is a block diagram of a data reception apparatus according to an exemplary embodiment of the present invention.

Referring to FIG. 13, the data reception apparatus, which may be a UE, may include a wireless communication unit 1310, a control unit 1320, a sequence generation unit 1330, and a storage unit 1340. The wireless communication unit 1310 may receive data from a BS via multiple transmission points and may receive information used for data reception. For example, the wireless communication unit 1310 may receive multiple candidate values usable for DMRS scrambling and may receive an indication to or a notification of a candidate value to be used for determining the initial state from the BS under control of the control unit 1320.

The control unit 1320 may control the wireless communication unit 1310 to receive information used for generating the DMRS scrambling sequences from a BS. For example, the control unit 1320 may control an operation to receive candidate sets of data through higher layer signaling and to receive an indication to or a notification of a candidate set to be used for determining the initial state through the PDCCH or the E-PDCCH. Furthermore, the control unit 1320 may control overall operations of the UE.

The sequence generation unit 1330 may determine the initial state for the DMRS scrambling sequences using candidate values received from the BS. When a subframe offset is not received from the BS, the sequence generation unit 1330 determines a subframe offset according to the Cell ID and a set of candidate Cell IDs that have been reported to the BS as a result of an RSRP measurement.

The storage unit 1340 may store information necessary for generating the DMRS scrambling sequences. For example, the storage unit 1340 may store information on candidate sets received from the BS and information on a set of candidate Cell IDs reported to the BS. Furthermore, the storage unit 1340 may store information on applications, user data, and other information used by or generated during operations of the UE.

According to the exemplary embodiments of the present invention, the method and apparatus for data transmission in a network supporting CoMP transmission may effectively randomize signal interference when multiple cells send data to one UE through CoMP transmission by having the cells to perform different DMRS scrambling operations.

The meaning of specific terms or words used in the specification and the claims should be construed in accordance with the spirit of the invention without limiting the subject matter thereof. The description of the various exemplary embodiments is to be construed as exemplary only and does not describe every possible instance of the invention. Therefore, it should be understood that various changes may be made and equivalents may be substituted for elements of the invention.

While the invention has been described with reference to certain exemplary embodiments thereof, it will be understood by those skilled in the art that various changes in form and details may be made therein without departing from the spirit and scope of the invention as defined by the appended claims and their equivalents.

What is claimed is:

1. A method by a terminal, the method comprising:
   receiving, from a base station, a plurality of identifiers for generating a demodulation reference signal (DMRS) sequence, wherein each of the plurality of identifiers corresponds to a scrambling index;
   receiving, from the base station, control information on a control channel;
   identifying the scrambling index and an identifier corresponding to the identified scrambling index based on an information field included in the control information;
   generating the DMRS sequence based on the identified scrambling index and the identifier; and
   receiving data based on the DMRS sequence; from the base station,
   wherein the DMRS sequence is initialized by applying both the identified scrambling index and the identifier as parameters, and
   wherein a bit length of the information field included in the control information is 1.

2. The method of claim 1, further comprising:
   receiving information on an antenna port allocation, from the base station; and
   receiving a DMRS based on the information on the antenna port allocation, from the base station.

3. The method of claim 1,
   wherein the plurality of the identifiers are received from the base station on higher layer signaling, and
   wherein the control information is received from the base station on a physical downlink control channel (PDCCH) or an enhanced-PDCCH (E-PDCCH).

4. A method by a base station, the method comprising:
   transmitting, to a terminal, a plurality of identifiers for generating a demodulation reference signal (DMRS) sequence, wherein each of the plurality of identifiers corresponds to a scrambling index;
   identifying a scrambling index and an identifier corresponding to the scrambling index for generating the DMRS sequence;
   transmitting, to the terminal, control information on a control channel, the control information including an information field for indicating the identified scrambling index and the identifier corresponding to the scrambling index;
   generating the DMRS sequence based on the identified scrambling index and the identifier; and
   transmitting data based on the DMRS sequence to the terminal,
   wherein the DMRS sequence is initialized by applying both the identified scrambling index and the identifier as parameters, and
   wherein a bit length of the information field included in the control information is 1 bit.

5. The method of claim 4, further comprising:
   transmitting information on an antenna port allocation, to the terminal; and
   transmitting a DMRS based on the information on the antenna port allocation, to the terminal.

6. The method of claim 4,
   wherein the plurality of the identifiers are transmitted to the terminal on higher layer signaling, and
   wherein the control information is transmitted to the terminal on a physical downlink control channel (PDCCH) or an enhanced-PDCCH (E-PDCCH).

7. A terminal, the terminal comprising:
   a transceiver; and
   a controller coupled with the transceiver and configured to:
     receive, from a base station via the transceiver, a plurality of identifiers for generating a demodulation reference signal (DMRS) sequence, wherein each of the plurality of identifiers corresponds to a scrambling index,
     receive, from the base station via the transceiver, control information on a control channel,
     identify the scrambling index and an identifier corresponding to the scrambling index based on an information field included in the control information,
     generate the DMRS sequence based on the identified scrambling index and the identifier, and
     receive, from the base station via the transceiver, data based on the DMRS sequence,
   wherein the DMRS sequence is initialized by applying both the identified scrambling index and the identifier as parameters, and
   wherein a bit length of the information field included in the control information is 1 bit.

8. The terminal of claim 7, wherein the controller is further configured to:
   receive, from the base station via the transceiver, information on an antenna port allocation, and
   receive, from the base station via the transceiver, a DMRS based on the information on the antenna port allocation.

9. The terminal of claim 7, wherein the controller is further configured to:
   receive, from the base station via the transceiver, the plurality of the identifiers on higher layer signaling, and
   receive, from the base station via the transceiver, the control information on a physical downlink control channel (PDCCH) or an enhanced-PDCCH (E-PDCCH).

10. A base station, the base station comprising:
a transceiver; and
a controller is coupled with the transceiver and configured to:
- transmit, to a terminal via the transceiver, a plurality of identifiers for generating a demodulation reference signal (DMRS) sequence, wherein each of the plurality of identifiers corresponds to a scrambling index,
- identify a scrambling index and an identifier corresponding to the scrambling index for generating the DMRS sequence,
- transmit, to the terminal via the transceiver, control information on a control channel, the control information including information field for indicating the identified scrambling index and the identifier corresponding to the scrambling index,
- generate the DMRS sequence based on the identified scrambling index and an identifier, and
- transmit, to the terminal via the transceiver, data based on the DMRS sequence,
- wherein the DMRS sequence is initialized by applying both the identified scrambling index and the identifier as parameters, and
- wherein a bit length of the information field included in the control information is 1 bit.

11. The base station of claim 10, wherein the controller is further configured to:
- transmit, to the terminal via the transceiver, information on an antenna port allocation, and
- transmit, to the terminal via the transceiver, a DMRS based on the information on the antenna port allocation.

12. The base station of claim 10, wherein the controller is further configured to:
- transmit, to the terminal via the transceiver, the plurality of the identifiers on higher layer signaling, and
- transmit, to the terminal via the transceiver, the control information on a physical downlink control channel (PDCCH) or an enhanced-PDCCH (E-PDCCH).

* * * * *